(12) United States Patent
Ou et al.

(10) Patent No.: US 8,310,822 B2
(45) Date of Patent: Nov. 13, 2012

(54) COMPUTER

(75) Inventors: Guang-Feng Ou, Shenzhen (CN);
Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 173 days.

(21) Appl. No.: 12/889,547

(22) Filed: Sep. 24, 2010

(65) Prior Publication Data
US 2011/0279960 A1 Nov. 17, 2011

(30) Foreign Application Priority Data
May 17, 2010 (CN) .......................... 2010 1 0173834

(51) Int. Cl.
*H05K 5/00* (2006.01)
*H05K 7/00* (2006.01)

(52) U.S. Cl. ............................... 361/679.08; 361/679.2

(58) Field of Classification Search ............. 361/679.08, 361/679.2
See application file for complete search history.

(56) References Cited

U.S. PATENT DOCUMENTS

| | | | | |
|---|---|---|---|---|
| 5,885,017 | A * | 3/1999 | Hultzman et al. | 400/682 |
| 6,257,542 | B1 * | 7/2001 | Westfield et al. | 248/551 |
| 6,430,037 | B1 * | 8/2002 | Oba et al. | 361/679.15 |
| 6,490,154 | B2 * | 12/2002 | Thompson | 361/679.41 |
| 6,700,773 | B1 * | 3/2004 | Adriaansen et al. | 361/679.08 |
| 6,796,536 | B1 * | 9/2004 | Sevier, IV | 248/121 |
| 7,007,912 | B1 * | 3/2006 | Giuliani et al. | 248/552 |
| 2004/0114319 | A1 * | 6/2004 | Hill et al. | 361/683 |
| 2004/0177658 | A1 * | 9/2004 | Mitchell | 70/58 |
| 2006/0152898 | A1 * | 7/2006 | Hirayama | 361/683 |
| 2007/0012827 | A1 * | 1/2007 | Fu et al. | 248/163.1 |

* cited by examiner

*Primary Examiner* — Anthony Haughton
(74) *Attorney, Agent, or Firm* — Altis Law Group, Inc.

(57) ABSTRACT

A computer includes a display assembly, a base, a stand, and a keyboard. The base includes a supporting board and an engaging board. The stand is located on the base supporting the display assembly. The keyboard includes a main body and an extension board extending from the main body. The main body has a key area. The extension board is fixed to the engaging board to help stabilize the display assembly.

20 Claims, 3 Drawing Sheets

COMPUTER

BACKGROUND

1. Technical Field

The present disclosure relates to computers, especially to an all-in-one computer with a keyboard.

2. Description of Related Art

All-in-one computers are desktop computers that combine the monitor into the same case as the CPU (Central Processing Unit). All-in-one PCs (Personal Computers) are typically more portable than other desktop PCs. However, all-in-one computers still have some separated peripheral devices (e.g. keyboards). It is inconvenient for users to transport a computer and peripheral devices as separate pieces.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
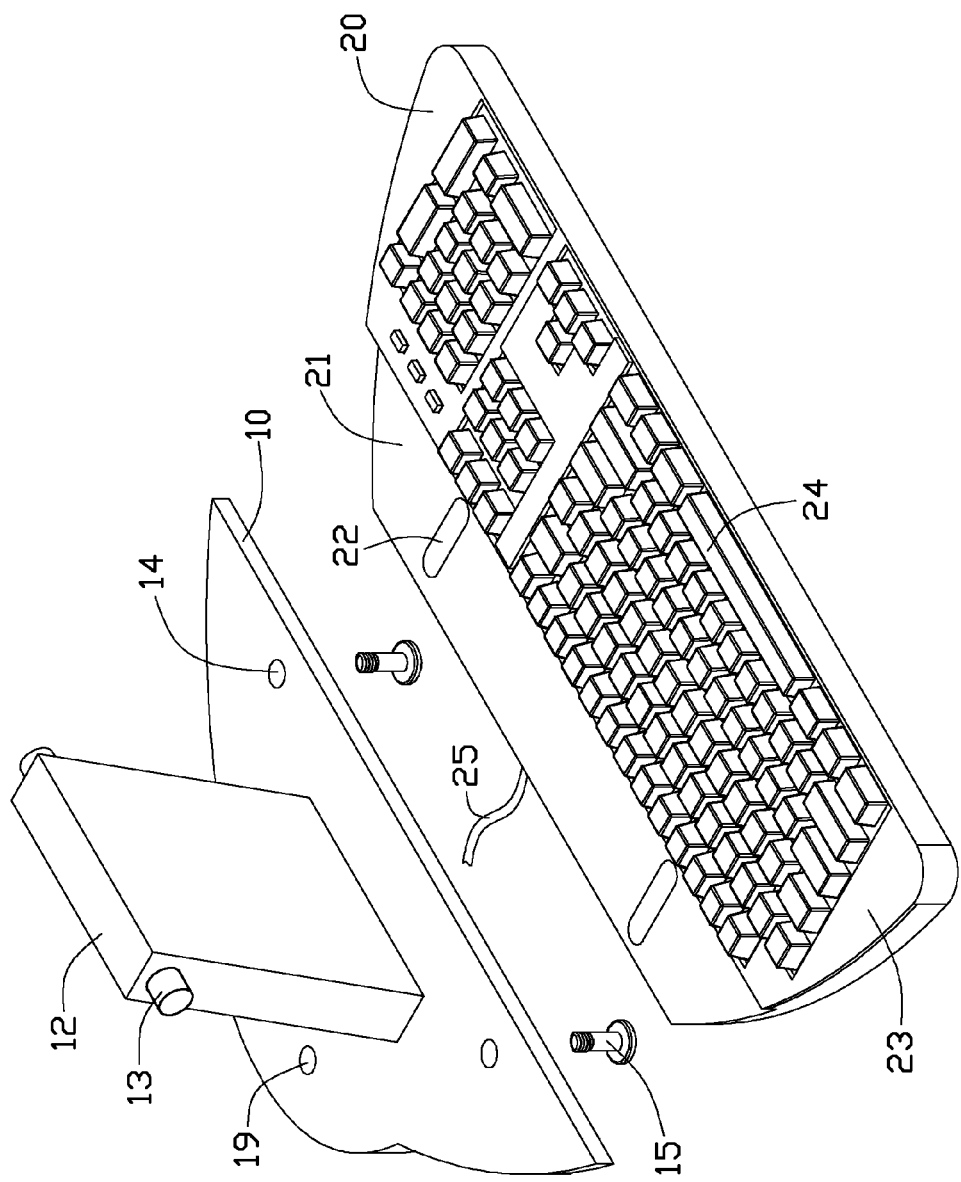
FIG. 1 is an exploded view of a computer in accordance with an embodiment.
Figure 2:
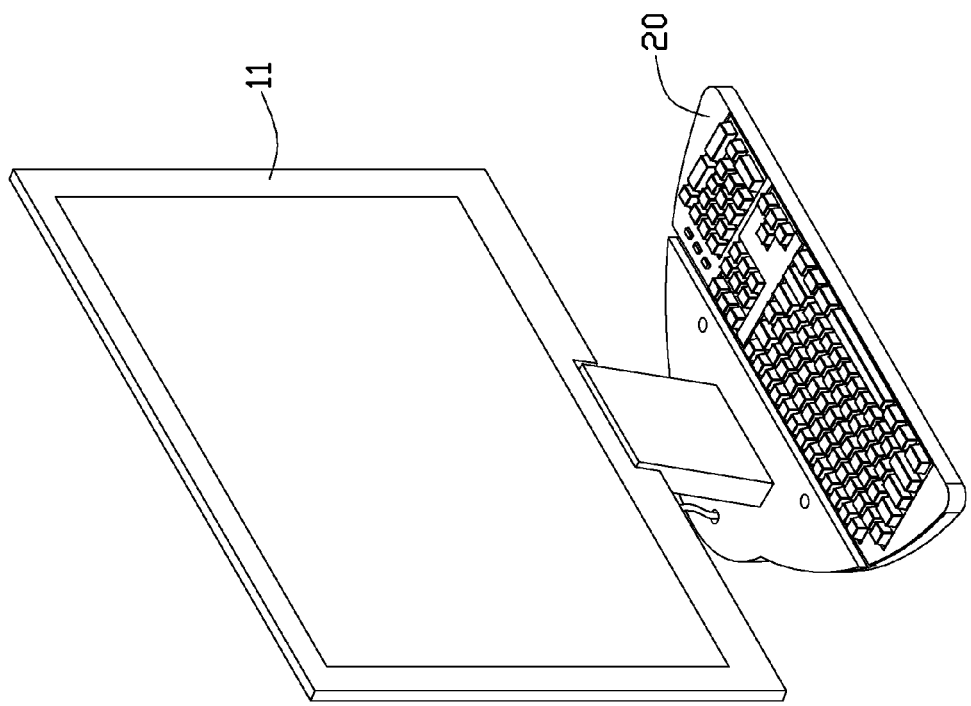
FIG. 2 is an assembled view of the computer of FIG. 1.

Referring to FIGS. 1 and 2, a computer in accordance with an embodiment is shown. The computer includes a display assembly 11, a base 10, a stand 12 supporting the display assembly 11, and a keyboard 20. In one embodiment, the display assembly 11 may include a display and an integrated computer system. A pivot post 13 extends from the stand 12 to pivotably engage with the display assembly 11. The stand 12 upwardly and obliquely extends from the base 10.

Figure 3:
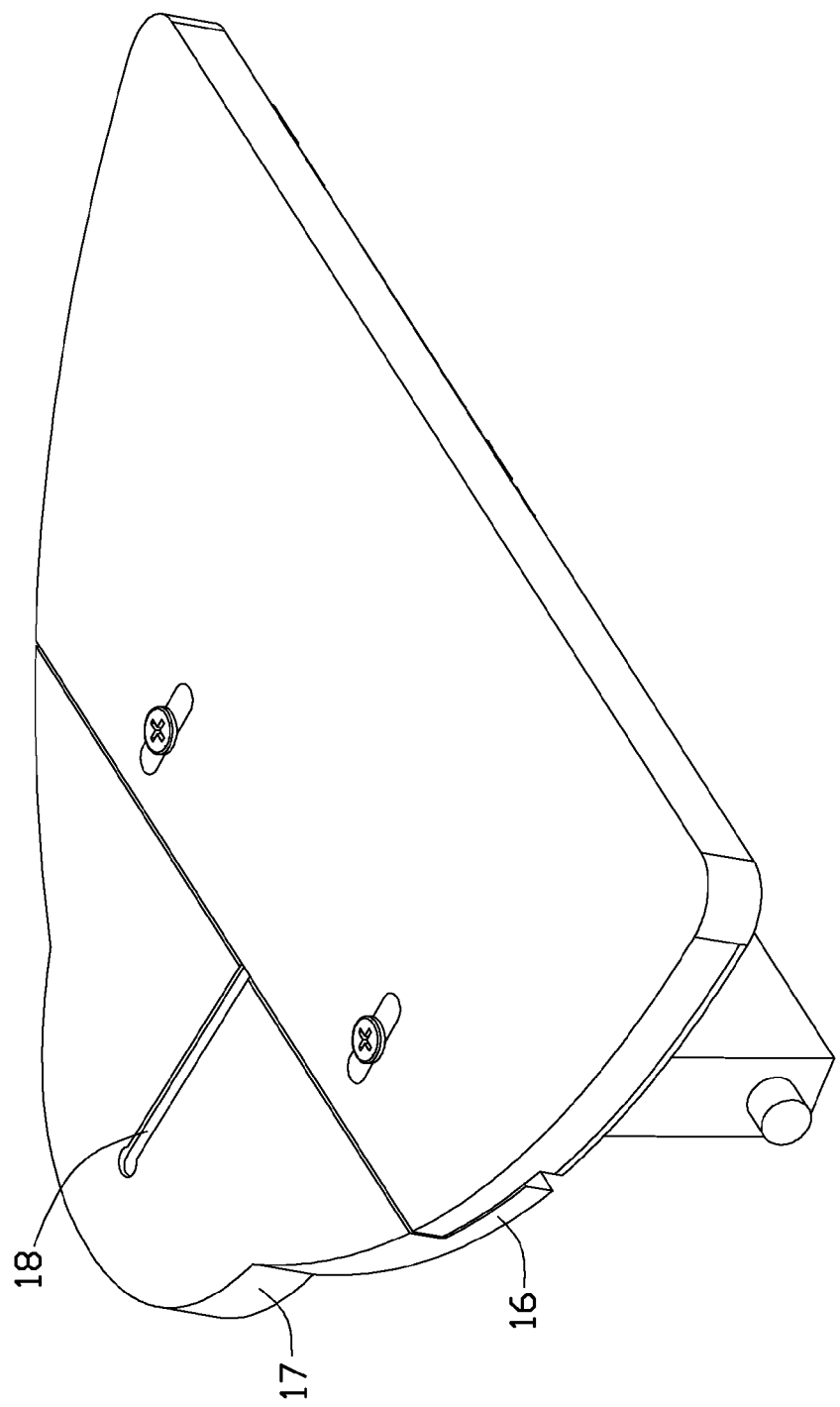
FIG. 3 is similar to FIG. 2, but viewed from another aspect.

Referring also to FIG. 3, the base 10 includes a supporting board 17 and an engaging board 16. Two opposite side edges of the base 10 are substantially arcuate. The engaging board 16 extends from the supporting board 17. The engaging board 16 has a straight engaging edge (not labeled) extending towards the keyboard 20. A thickness of the supporting board 17 is greater than that of the engaging board 16. A top surface of the supporting board 17 is substantially coplanar with a top surface the engaging board 16. Two mounting holes 14 are defined in the engaging board 16. A cable groove 18 is defined in a bottom surface of the supporting board 17 opposite to the stand 12. A through hole 19 is defined in the supporting board 17 connecting to the cable groove 18. In one embodiment, the cable groove 18 is straight and substantially perpendicular to the engaging edge of the engaging board 16.

The keyboard 20 includes a main body 23 and an extension board 21 extending from the main body 23. The main body 23 has a key area 24. The extension board 21 extends from the main body 23 and has a straight engaging edge (not labeled) towards the supporting board 17 of the base 10. A thickness of the main body 23 is larger than that of the extension board 21. A bottom surface of the main body 23 is substantially coplanar with a bottom surface of the extension board 21. Two guiding slots 22 are defined in the extension board 21 along a direction that is substantially perpendicular to the engaging edge of the extension board 21. The guiding slots 22 respectively correspond to the mounting holes 14. The keyboard 20 has a cable 25 extending from the extension board 21. The keyboard 20 has two opposite arcuate side edges. A thickness of the main body 23 may substantially equal that of the supporting board 17.

Two fasteners 15 are provided to secure the keyboard 20 to the base 10.

During assembly of the computer, the display assembly 11 is pivotably secured to the stand 12. The two guiding slots 22 are aligned with the two mounting holes 14. The extension board 21 and the engaging board 16 are overlapped with each other. A total thickness of the extension board 21 and the engaging board 16 are substantially equal to a thickness of the supporting board 17 or the main body 23. The two fasteners 15 extend through the two guiding slots 22 and are secured to the mounting holes 14. The keyboard 20 is slidably mounted to the base 10 with the fasteners 15 received in the two guiding slots 22. When the engaging edge of the engaging board 16 moves to contact the keyboard 20, two opposite side edges of the base 10 extend to the two opposite side edges of the keyboard 20 to form two substantially arcuate outer edges. The cable 25 is received in the cable groove 18 and one end of the cable 25 extends through the through hole 19 from the bottom surface to the top surface of the supporting board 17 so that the keyboard 20 can be easily connected to the display assembly 11.

During disassembly, the two fasteners 15 are loosened from the base 10, and the keyboard 20 can then be removed from the base 10.

Before the keyboard 20 is disassembled, the display assembly 11 is cooperatively supported by the base 10 and the keyboard 20 through the stand 12. In other embodiments, the display assembly 11 can be solely supported by the base 10, so that when the keyboard 20 is removed from the base 10 or a separate keyboard is used, the display assembly 11 can be directly supported by the base 10.

Referring to FIG. 3, in one embodiment, the keyboard 20 can also be securely fixed to the base 10 directly.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer comprising:
   a display assembly;
   a base, the base comprising a supporting board and an engaging board;
   a stand, located on the base, supporting the display assembly;
   a keyboard, the keyboard comprising a main body and an extension board extending from the main body, the main body having a key area; and
   a fastener;
   wherein the extension board defines a guiding slot, the engaging board defines a mounting hole aligned with the guiding slot, and the fastener is secured to the engaging board through the guiding slot and the mounting hole;

the keyboard is slidably mounted to the base, and the fastener is slidably in the guiding slot relative to the keyboard; and the extension board is fixed to the engaging board to help stabilize the display.

2. The computer of claim 1, wherein the extension board and the engaging board overlap each other.

3. The computer of claim 2, wherein a total thickness of the extension board and the engaging board are substantially equal to a thickness of the supporting board.

4. The computer of claim 3, wherein a thickness of the main body is substantially equal to the thickness of the supporting board.

5. The computer of claim 2, wherein a bottom surface of the main body is substantially coplanar with a bottom surface of the extension board, and a top surface of the engaging board is substantially coplanar with a top surface of the main body.

6. The computer of claim 1, wherein the keyboard comprises a cable extending from the extension board, and a cable groove is defined in the supporting board, a part of the cable is received in the cable groove unbent, and the cable groove is defined in a bottom surface of the supporting board opposite to the stand.

7. The computer of claim 6, wherein a through hole is defined in the supporting board is connected to the cable groove for guiding the cable to the display assembly.

8. The computer of claim 7, wherein the cable extends out of the through hole, an extending direction of the cable out of the through hole is substantially perpendicular to an extending direction of the part of the cable received in the cable groove.

9. The computer of claim 1, wherein each of the base and the keyboard has two substantially arcuate side edges.

10. The computer of claim 1, wherein the stand upwardly and obliquely extends from the base.

11. A computer comprising:
a display assembly;
a base, the base comprising a supporting board and an engaging board;
a stand, located on the base, supporting the display assembly; and
a keyboard, the keyboard comprising a main body and an extension board extending from the main body, the main body having a key area, wherein the extension board is slidably fixed to the engaging board, and the keyboard is removably attached to the base;
wherein the keyboard further comprises a cable extending from the extension board; a cable groove is defined in a bottom surface of the supporting board, and a through hole is defined in the supporting board; a part of the cable is received in the cable groove unbent, and an end of part of the cable extends out of the through hole.

12. The computer of claim 11, wherein a guiding slot is defined in the extension board, a fastener is mounted to the engaging board through the extension board, and the keyboard is movably engaged with the fastener.

13. The computer of claim 11, wherein the extension board and the engaging board overlap each other.

14. The computer of claim 13, wherein a total thickness of the extension board and the engaging board are substantially equal to a thickness of the supporting board.

15. The computer of claim 14, wherein a thickness of the main body is substantially equal to the thickness of the supporting board.

16. The computer of claim 13, wherein a bottom surface of the main body is substantially coplanar with a bottom surface of the extension board, and a top surface of the engaging board is substantially coplanar with a top surface of the main body.

17. The computer of claim 11, wherein the cable groove is defined in the supporting board opposite to the stand.

18. The computer of claim 11, wherein the through hole is connected to the cable groove for guiding the cable to the display assembly.

19. The computer of claim 11, wherein each of the base and the keyboard has two substantially arcuate side edges.

20. The computer of claim 11, wherein the part of the cable received in the cable groove is substantially perpendicular to an extending direction of the end of the part of the cable extending out of the through hole.

* * * * *